United States Patent
Humpert et al.

(10) Patent No.: US 7,792,594 B2
(45) Date of Patent: Sep. 7, 2010

(54) REDUNDANT AUTOMATION SYSTEM COMPRISING A MASTER AND A STANDBY AUTOMATION DEVICE

(75) Inventors: Hans-Dieter Humpert, Hemhofen (DE); Dieter Kleyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 985 days.

(21) Appl. No.: 11/587,870

(22) PCT Filed: Apr. 21, 2005

(86) PCT No.: PCT/EP2005/051782
§ 371 (c)(1),
(2), (4) Date: Oct. 27, 2006

(87) PCT Pub. No.: WO2005/106603
PCT Pub. Date: Nov. 10, 2005

(65) Prior Publication Data
US 2007/0176732 A1   Aug. 2, 2007

(30) Foreign Application Priority Data
Apr. 27, 2004   (EP)   ................................. 04009999

(51) Int. Cl.
*G05B 11/01* (2006.01)
(52) U.S. Cl. ............................. 700/21; 700/79; 700/81; 700/82; 702/33; 702/85; 702/105; 340/508
(58) Field of Classification Search ................ 340/508; 702/33, 35, 81, 85, 105; 700/1, 2, 3, 4, 21, 700/79, 81, 82
See application file for complete search history.

(56) References Cited

U.S. PATENT DOCUMENTS

| | | | |
|---|---|---|---|
| 4,581,701 A * | 4/1986 | Hess et al. | 700/82 |
| 5,464,435 A * | 11/1995 | Neumann | 607/9 |
| 6,411,857 B1 * | 6/2002 | Flood | 700/4 |
| 6,424,258 B1 | 7/2002 | Claes | |
| 2004/0006624 A1 * | 1/2004 | Hawkinson et al. | 709/227 |
| 2005/0033802 A1 * | 2/2005 | Pauly et al. | 709/203 |
| 2005/0097165 A1 * | 5/2005 | Lahtinen et al. | 709/203 |
| 2006/0056285 A1 * | 3/2006 | Krajewski et al. | 370/216 |
| 2007/0128895 A1 * | 6/2007 | Kleyer et al. | 439/76.1 |
| 2010/0005336 A1 * | 1/2010 | Jordan et al. | 714/4 |

FOREIGN PATENT DOCUMENTS

| DE | 100 64 673 A1 | 7/2002 |
|---|---|---|
| EP | 1 385 070 A2 | 1/2004 |

OTHER PUBLICATIONS

A.Anton Frederickson; "Fault Tolerant Programmable Controllers for Safety Systems"; ISA Transactions; 1990; pp. 13-16; vol. 29, No. 2; XP 000114560; Research Triangle Park, NC, US.

Richard Fischer; "Fault-Tolerant PLCs Eliminate Production Standstill"; Siemens Energy & Automation, 2466; May/Jun. 1990; p. 6-7; vol. 12, No. 3; XP 000137612; Berlin, Germany.

* cited by examiner

*Primary Examiner*—Travis R Hunnings

(57) ABSTRACT

The invention concerns a redundant computerizing system comprising additionally to a master programmable automaton and a standby programmable automaton, a computerized monitoring device enabling a memory image of the comparison process concerning a certain number of output signals of the computerizing system to be set up.

12 Claims, 1 Drawing Sheet

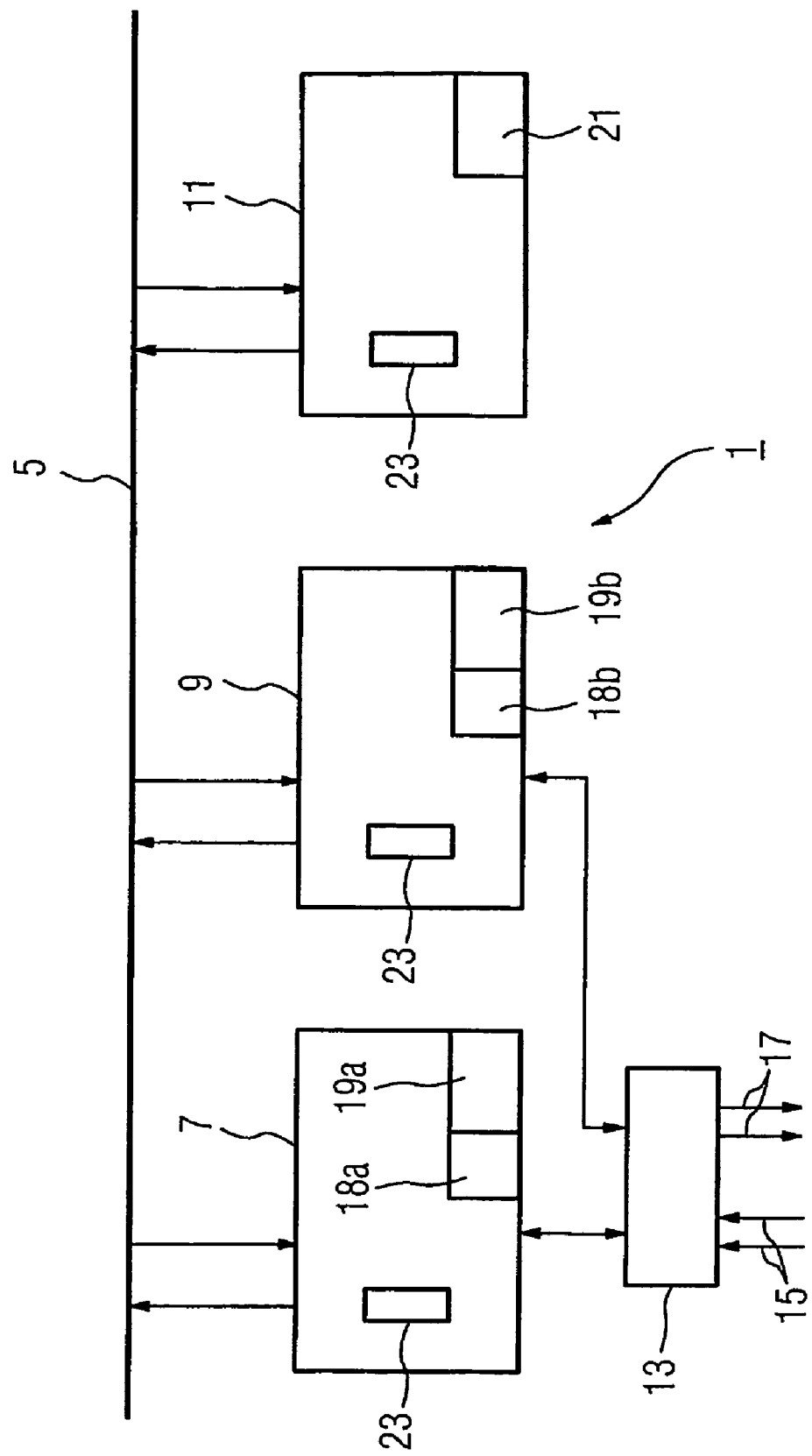

REDUNDANT AUTOMATION SYSTEM COMPRISING A MASTER AND A STANDBY AUTOMATION DEVICE

CROSS REFERENCE TO RELATED APPLICATIONS

This application is the US National Stage of International Application No. PCT/EP2005/051782, filed Apr. 21, 2005 and claims the benefits of European Patent application No. 04009999.6 filed Apr. 27, 2004. All of the applications are incorporated by reference herein in their entirety.

FIELD OF INVENTION

The invention relates to a redundant automation system for controlling a technical process.

BACKGROUND OF THE INVENTION

In many industrial applications automation systems are used for controlling technical processes. A failure of these automation systems inevitably leads to a fault in the technical execution and thereby for example to a failure of production of goods or energy.

To prevent an interruption of the production process the use of so-called high-availability automation devices based on Programmable Logic Controllers within the framework of the automation system is known, with the automation devices being duplicated in such cases and means being available for switchover between the automation devices in the event of an error.

These types of automation solution require a major financial investment since the known systems are highly specialized and technically very complex and thus also very expensive.

Errors which can occur during the control of a technical process with regard to the automation systems on the one hand relate to the control software running on the automation devices, but on the other hand also relate to the hardware components used.

As regards the last-mentioned errors, problems do not usually arise as a result of a total failure of an automation device, but as a result of static and/or sporadic faults of individual hardware components of the automation devices.

In such cases output signals then occur as a result relating to the faulty automation device, which although present and thus theoretically also able to be switched to the technical process, are however affected by errors.

These types of error can be of a transitory nature, for example if a hardware component of an automation device merely has a random error for a short time, caused by a temporary overheating of the component for example.

It is also conceivable however that one or more hardware components are permanently producing corrupted output signals right from the onset of a fault.

If two automation devices are now employed in parallel in a redundant automation system, which feature different output signals from each other in the form of a corresponding process image, in practice this device can only be identified as faulty for certain on total failure of an automation device. Otherwise, if there are discrepancies between the process images of the automation devices of a redundant automation system, it is not possible to simply decide which of the relevant process images involved is to be viewed as incorrect.

SUMMARY OF INVENTION

The object of the invention is thus to specify an alternative redundant automation system to known solutions from the prior art, which has a simple structure and which can be implemented at low cost.

In particular hardware errors relating to one of the automation devices should be able to be securely detected with an inventive redundant automation system.

The object is achieved in accordance with the invention by a redundant automation system for controlling a technical process comprising a master and a standby automation device, with a computer-aided monitoring device being connected to both the master and also to the standby automation device, with an input process image relating to an amount of process data of the technical process being transmitted to the monitoring device and with a comparison process image relating to a number of output signals of the automation system being able to be determined by means of the monitoring device.

The invention is based on the idea that secure error detection and error assignment is only possible, if on the basis of a majority vote, a unique decision can be made about which of the automation devices is faulty, or if necessary whether the monitoring device itself is faulty.

This is why a computer-aided monitoring device which is separate from the master and standby automation devices is provided in an inventive automation system.

This monitoring device is not connected directly to what is known as the process periphery, that is the automation devices of the automation system which detect input and output; Instead the monitoring device receives the input signals relating to the technical process indirectly in the form of what is known as a software-based process image via a communication link by means of which the monitoring device is connected to said automation devices.

The input process image is in this case essentially a software image of process signal states at a specific point in time.

The said automation devices are connected directly to the process periphery and read in the process signals occurring there in order to generate the input process image from these signals.

This input process image is then transmitted to the monitoring device.

The purpose of automation devices is essentially to process the process signals using the said input process image, for example by means of closed-loop control and/or open-loop control algorithms, and to transfer the output signals generated in such cases to the process periphery in order to control the technical process.

If an error now occurs relating to an automation device in a redundant automation system that does not lead to a total failure of the automation device involved, the output signals of the automation devices differ and it is not a simple matter to decide whether the output signals of the one or of the other automation device are error-free and are to be transferred to the process periphery.

The monitoring device is thus provided in the inventive automation system by means of which the comparison process images are determined by processing the input process image. As a result not only the relevant output process image of the automation devices but also the comparison process image are available to enable a decision to be made about whether the said process images are error-free.

In a preferred embodiment there is thus provision for the comparison process image to be able to be compared by means of the monitoring device both to a first process image relating to a number of output signals of the master automation device and also to a second process image relating to a corresponding number of output signals of the standby automation device.

If one of the said devices is now affected by an error, the process images of the two other devices match each other. The incorrect process image is thus able to be uniquely assigned to the faulty device.

Preferably it is thus possible to decide in the form of a two-out-of-three decision whether, and if necessary which of the devices is operating incorrectly.

"Two-out-of-three" in this context means that the system investigates whether on the one hand the process images differ at all, and if they do, which of the process images is different from the other process images.

In an especially preferred embodiment the same control software for generating the output signals of these devices is installed in each case on the said devices.

In this exemplary embodiment it is possible to state particularly securely which of the devices is operating incorrectly since errors can be excluded in advance which could have been caused by different software programs of the devices. Furthermore the devices can be functionally interchanged and this does not only relate to sub-aspects.

It is especially preferable to connect the master automation device, the standby automation device and the monitoring device by a fast communication link by means of which at least one of the process images can be transmitted from one of the devices to one of the other devices within a period of at most 100 ms.

This is required in a complex applications, especially in the power station field, in order on the one hand to guarantee rapid error detection and on the other hand to guarantee in the event of an error a rapid and smooth switchover to the non-faulty automation device.

This type of fast communication link can be implemented for example by a known 1 Gbit/sec Ethernet and/or by using what are known "reflective memory" modules, which for example have a transfer rate of up to 2.12 Gbit/sec.

Tasks and/or processes which are running on the devices are synchronized in a preferred embodiment by means at least one interrupt.

With this embodiment it is especially securely guaranteed that process images generated by the devices are available almost simultaneously and correspond in each case to the same input process image. Errors which could be produced by time-offset processing of the input process image and do not relate to an error of a software and or hardware component are practically excluded in this case and erroneous error assumptions relating to such errors are avoided.

In a further preferred embodiment the connection between the said devices can be monitored by means of a periodically transmitted sign-of-life signal.

With this embodiment account is additionally taken of the fact that an error can occur in the communication link and not just locally at a device.

One or more of the devices, preferably the monitoring device, sends a periodic signal over the communication link in this case which is periodically checked for receipt by at least one other of the devices.

If this signal is not now received this is a strong indication that there is an error on a communication link since the local errors of the devices can be detected according to the invention in another way and usually more quickly as well.

Especially preferably the said devices are based on standard PC components.

This makes it possible to implement the inventive redundant automation system in a thoroughly cost-effective manner, in which case it is possible to profit from the fast pace of development of performance of the said standard PC components. In addition it is easy to procure spares for the system or to expand the devices by additional components.

One advantage common to all the stated embodiments lies particularly in the fact that the detection of the errors is possible independent of the device components actually used; it is thus not necessary and to use specific technical data of the devices, for example relating to the "chipsets" used, for error detection. Instead the error detection can be performed independently of the types of device component actually used.

In addition availability can be improved by diversity of the devices are as well as by the software used.

BRIEF DESCRIPTION OF THE DRAWINGS

An exemplary embodiment of the invention is explained in more detail below.

The FIGURE shows:

FIGURE an inventive redundant automation system.

DETAILED DESCRIPTION OF INVENTION

The FIGURE shows a redundant automation system 1 in accordance with the invention, comprising a master automation device 7 and a standby automation device 9.

A computer-aided monitoring device 11 is assigned to the said devices.

A communication link 5 is provided for a rapid exchange of data between the devices 7, 9, 11.

The redundant automation system 1 is used to control a technical process not shown in any greater detail.

Process data 15 is recorded by the technical process by means of a process periphery 13 which comprises input and output means, and output signals 17 are issued to the process. Process data 15 is for example also referred to as process input signals or input signals.

The process periphery 13 is connected to both the master automation device 7 and also to the standby automation device 9. A connection between the process periphery 13 and the monitoring device 11 is not provided and is also not required, since in accordance with the invention errors are detected by comparing process images, for which a physical coupling of the monitoring device 11 to the process periphery 13 is not necessary. A failure of the process periphery 13 would in any event inevitably lead to the failure of the complete automation system, in which case even a direct coupling of the process periphery 13 to the monitoring device 11 would not change anything.

In order to minimize these types of error as well a redundant process periphery 13 can be provided.

The process data 15 from the technical process is stored in the form of a software input process image 18a, 18b both in the master automation device 7 and also in the standby automation device 9. The input process image 18a, 18b is also transferred to the monitoring device 11 via the communication link 5.

The process data 15 present in the form of the said input process image in the devices 7, 9, 11 is now processed in accordance with a control program in the devices 7, 9, 11 and the results determined in this processing are determined as an output process image 19a, 19b of the master automation device 7 or of the standby automation device 9. The output process image 19a, 19b of the device functioning as the master is then switched to the process periphery 13 to make available for the technical process the current output signals 17.

As a result the output signals 17 are determined either on the basis of the output process image 19a of the master automation device 7 or on the basis of the output process image 19b of the standby automation device 9.

To now be able to decide whether one of the said output process images 19a, 19b is incorrect, there is provision for the generation of a comparison process image 21 by means of the monitoring device 11.

Since the monitoring device 11, like the other devices, makes the input process image 18a, 18b available, like the other devices it can determine an output process image from this image which, in connection with the monitoring device 11, is referred to as the comparison process image 21 since this process image is not provided for connection to the process periphery 13 but merely for comparison purposes with the output process images 19a, 19b of devices 7, 9.

The output process images 19a, 19b are also transmitted via the communication link 5 to the monitoring device 11, which can now establish whether one of the output process images 19a, 19b and the comparison process image 21 differs from the other two process images.

The process image which differs from the other two process images can then be uniquely assigned in a type of two-out-of-three decision to the faulty device 7, 9, 11, by which the error is uniquely localized.

The devices 7, 9, 11 each include a switchover logic 23, by means of which, in the event of an error, the output process image 19a, 19b of the error-free device can be switched to the process periphery 13.

The devices 7, 9 and 11 are preferably based on standard PC components.

The invention claimed is:

1. A redundant automation system for controlling a technical process, comprising:
    a process data of the technical process;
    a master and a standby automation device constructed to generate from the process data:
        an input process image, and
        a respective output process image relating to a plurality of output signals of the automation system; and
    a computer-aided monitoring device that determines a comparison process image relating to the number of output signals of the automation system; and
    a communication connection that connects the computer-aided monitoring device to the master and the standby automation devices that transmits the input process image to the monitoring device.

2. The redundant automation system as claimed in claim 1, wherein, the comparison process image is compared by the monitoring device with a first process image in relation to a number of output signals of the master automation device, and to a second process image relating to a corresponding number of output signals of the standby automation device.

3. The redundant automation system as claimed in claim 2, wherein a 2-out-of-3 comparison determines if a device is operating incorrectly.

4. The redundant automation system as claimed in claim 3, wherein which incorrectly operating device is determined.

5. The redundant automation system as claimed in claim 3, wherein the incorrectly operating device is selected from the group consisting of: master automation device, standby automation device and monitoring device.

6. The redundant automation system as claimed in claim 5, wherein a control software for creating the output signals is installed on the master automation device, standby automation device and monitoring device.

7. The redundant automation system as claimed in claim 6, wherein the master automation, standby automation and monitoring devices are connected by a fast communication link.

8. The redundant automation system as claimed in claim 7, wherein at least one input or output process image is transmitted from one of the devices to another of the devices within a time of less than 0.1 sec.

9. The redundant automation system as claimed in claim 8, wherein a synchronization of an execution sequence of tasks or processes on the input or output devices is achieved by an interrupt.

10. The redundant automation system as claimed in claim 9, wherein the connection between the input or output devices is monitored by a sign-of-life signal.

11. The redundant automation system as claimed in claim 10, wherein the input or output devices are standard components.

12. A redundant automation system for controlling a technical process, comprising:
    a process data of the technical process;
    a master and a standby automation device constructed to generate from the process data:
        an input process image, and
        a respective output process image relating to a plurality of output signals of the automation system; and
    a computer-aided monitoring device that determines a comparison process image relating to the number of output signals of the automation system; and
    a fast communication connection that connects the computer-aided monitoring device to the master and the standby automation devices that transmits the input process image to the monitoring device, wherein the input or output process image is transmitted from one of the master or standby devices to another of the devices within a time of less than 0.1 sec.

* * * * *